United States Patent [19]

Yoshida

[11] 4,255,713
[45] Mar. 10, 1981

[54] CARRIER REGENERATION CIRCUIT FOR POLYPHASE MODULATION SYSTEM

[75] Inventor: Yasuharu Yoshida, Tokyo, Japan

[73] Assignee: Nippon Electric Co., Ltd., Tokyo, Japan

[21] Appl. No.: 16,848

[22] Filed: Mar. 2, 1979

[30] Foreign Application Priority Data

Mar. 3, 1978 [JP] Japan .................................. 53/24643

[51] Int. Cl.³ .............................................. H03D 3/18
[52] U.S. Cl. ...................................... 329/50; 329/112; 329/124; 375/81; 375/86
[58] Field of Search ................ 329/50, 104, 112, 122, 329/124; 325/320, 346, 347, 420, 30; 178/88; 331/12; 375/81, 82, 86, 94, 53

[56] References Cited

U.S. PATENT DOCUMENTS

| 3,845,412 | 10/1974 | Rearwin et al. | 332/9 R |
|---|---|---|---|
| 3,983,499 | 9/1976 | Tan | 329/112 |
| 4,039,961 | 8/1977 | Ishio et al. | 329/50 |
| 4,055,727 | 10/1977 | Katoh | 178/68 |
| 4,099,130 | 7/1978 | Yoshida | 329/112 X |
| 4,109,102 | 8/1978 | Yoshida et al. | 375/86 |
| 4,114,710 | 9/1978 | Katoh et al. | 178/88 X |
| 4,143,322 | 3/1979 | Shimamura | 329/112 |

Primary Examiner—Siegfried H. Grimm
Assistant Examiner—Edward P. Westin
Attorney, Agent, or Firm—Sughrue, Rothwell, Mion, Zinn and Macpeak

[57] ABSTRACT

An n (=8, 9)-valued polyphase modulation system having circuit construction for carrier regeneration in which not only correct phase demodulation is effected but also any AM components of the regenerated carrier wave are effectively compensated for and in which the decision circuit is adapted to produce a signal output having no phase ambiguity which is coupled to a $\pi/4$ phase modulator unit of the carrier generator to serve as a drive signal therefor.

12 Claims, 12 Drawing Figures

CARRIER REGENERATION CIRCUIT FOR POLYPHASE MODULATION SYSTEM

BACKGROUND OF THE INVENTION

The invention relates to carrier regeneration circuits for regenerating reference carriers principally from QAM (quadrature amplitude modulation) waves formed by a quadrature partial response modulation system.

Polyphase PSK (phase shift keying) systems are presently in use. Recently, polyphase multiple-valued modulation systems have been investigated in which modulation is effected simultaneously in phase and in amplitude in order to utilize more efficiently the available bandwidth. Among others, close attention has been given to a 9-valued polyphase modulation system in which signal vectors or QAM signals formed by the quadrature partial response modulation system are arranged in lattice or grid form (for example, see U.S. Pats. Nos. 3,845,412 and 4,055,727).

Such polyphase multiple-valued modulation systems as previously developed nonetheless have retained some difficulties in circuit construction although they have enabled transmission of an increased amount of information. Particularly, the carrier regeneration circuit in this type of system has involved problems not encountered in processing PSK signals. First, for correct phase demodulation of QAM signals such as will be described below with reference to FIG. 1 of the accompanying drawings, there is a restriction that the reference carrier regenerated must be locked in phase at a multiple of $\pi/2$ radians. Secondly, since the modulated wave has an AM component, the carrier wave signal as extracted through a conventional carrier regeneration circuit for polyphase PSK use also has an AM component. Because of this, in a carrier sync circuit employing a voltage-controlled oscillator, carrier jitter will be increased in the event that the input signal undergoes any frequency offset resulting in an adverse effect on the performance of the demodulated output and thus making it desirable that the AM component be adequately compensated for.

Various attempts have been made to solve these new problems involved in the modulation system concerned. Among others, a carrier regeneration circuit intended to alleviate the first-described problem has been proposed in U.S. Pat. No. 4,114,710. As disclosed therein, the carrier regeneration circuit includes a pair of phase detectors for phase detection of the modulated signal input with a reference carrier wave, full-wave rectifier means for full-wave rectification of the respective outputs of the phase detectors, decision circuits for discriminating the outputs of the full-wave rectifiers at respective predetermined levels and producing a two-valued signal, a probability decision circuit for deciding the probability of generation of the modulated signals in response to the outputs of the respective decision circuits, and a 4-phase carrier regenerator arranged to receive the modulated input signal and phase-shift the regenerated carrier wave having a phase ambiguity (false lock) of $\pi/4$ radians in response to the output of the probability decision circuit to lock the regenerated carrier wave at an integral multiple of $\pi/2$ radians. Further, the probability decision circuit includes a NOR gate operable in response to the outputs of the decision circuits, an integrating circuit for integrating the output of the NOR gate, a pulse generator, a discriminator operable in response to the output of the pulse generator to discriminate the output of the integrating circuit, flip-flop means for storing the output of the discriminator, and means for supplying the output of the NOR gate and flip-flop to an Exclusive-Or gate incorporated in the 4-phase carrier regenerator.

In such a previously known form of carrier regeneration circuit, the output signal from the NOR gate, which varies bit by bit, is a signal which still retains a phase ambiguity and must be utilized with this ambiguity, the probability decision circuit serving to detect a false lock to thereby produce an inversion command signal which is coupled to the Exclusive-Or gate for inversion of the output signal from the NOR gate. In this connection, the flip-flop is so arranged that there is no return of the inversion command signal to the flip-flop which would cause repeated production of such command signal. Further, the input to the flip-flop is reset to "1" at regular intervals under control of the output of the pulse generator in order to avoid any continuation of a state of false lock that may otherwise occur should the output of the flip-flop remain unchanged during the sync pulling-in process in dependence upon the state of the input thereto. The length of resetting period should be short for rapid correction of the false lock state. However, any excessively short length of resetting period will result in some disturbance in the output of the Exclusive-Or gate during the sync pulling-in process, thus exerting an adverse effect upon the process per se by causing an increase in the length of the sync pulling-in time. As for the integrating circuit, a lapse of time exceeding its time constant is required before the output of the flip-flop is established which again causes an increase in the length of the sync pulling-in time. In other words, use of the probability decision circuit results in an extended length of sync pulling-in time on account of its decision output which is not produced for every signal bit.

In summary, the previously-known form of carrier regeneration circuit has disadvantages in that the length of sync pulling-in time is increased in comparison with that of conventional carrier regeneration circuits for PSK modulated waves and in that its circuit design is complicated since design parameters such as the time constant of the integrating circuit and the output period of the pulse generator are extended.

Such disadvantages are attributed principally to the fact that the output of the NOR gate has an ambiguity due to pull-in phase, as described above, which can be overcome by generation of a signal having no such phase ambiguity and using it in place of the NOR gate output to drive the $\pi/4$ modulator (doubler) in the carrier regenerator.

Figures 1, 3A:
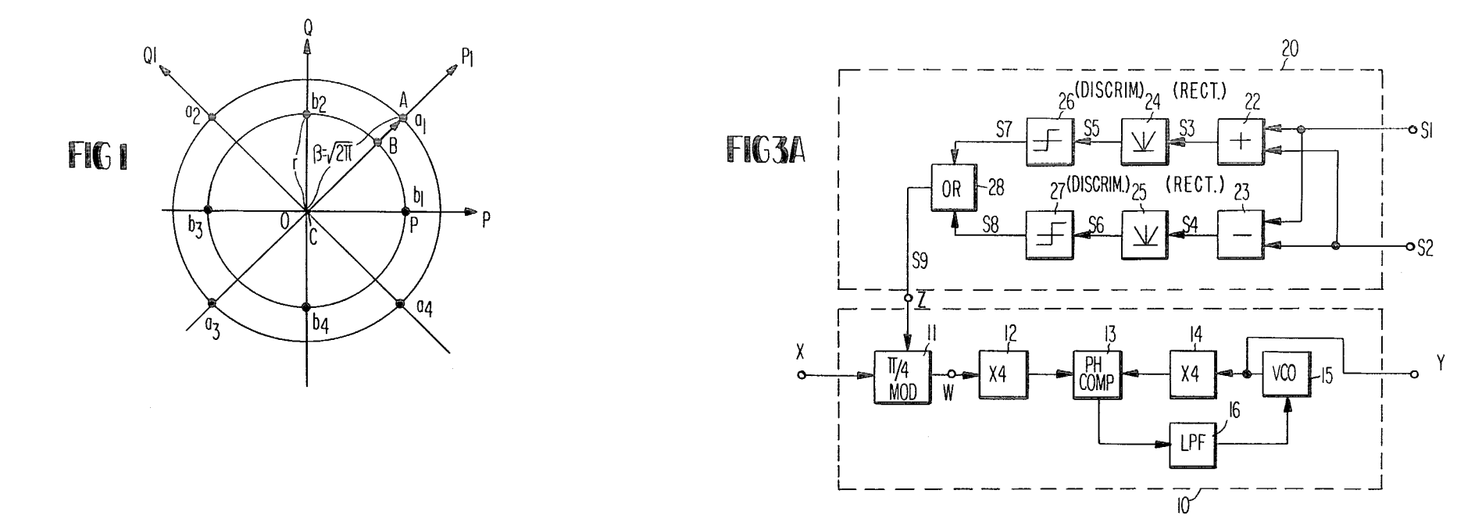
FIG. 1 is a vector diagram illustrating the QAM signal of the partial response modulation system.
FIG. 3A is a detailed block diagram of the decision circuit and carrier regenerator shown in FIG. 2.

For obtaining such drive signal, a method has been disclosed wherein, with reference to FIG. 1, there is a level difference of $\sqrt{2}$ times between vector signals $1_1$, $a_2$, $a_3$ and $a_4$ and those $b_1$, $b_2$, $b_3$ and $b_4$ and wherein the input modulated wave is subjected to envelope detection to detect its AM component and the detection signal is discriminated to obtain a desired drive signal. As it is obtained directly from the input modulated wave, the drive signal has no ambiguity and can be used successfully to drive the $\pi/4$ modulator. This method of drive signal production nonetheless involves some deficiencies, as follows: Referring to FIG. 1, the distance of discrimination between vector signals $a_1$–$a_4$ and $b_1$–$b_4$ is $\overline{AB} = \beta - \gamma = (\sqrt{2} - 1)$ and that of main signals $b_1$–$b_4$ at the output of the phase detector is $OD=\gamma$. Thus, between the two distances, there is a difference of 20 log $[\gamma 2-1)/\gamma]=7.6$ dB. This means that the bit error rate characteristic of the signal obtainable by the envelope detection method is 7.6 dB below the equivalent input C/N (where C and N represent the carrier and thermal noise levels, respectively). That is, even where the code error rate of the main signal as obtained from the decision circuits is of the order of $1 \times 10^{-5}$, the detected output envelope has a code error rate on the order of $4 \times 10^{-2}$. Use of a drive signal having such a bit error rate causes frequent changes in the pull-in phase or it results in an out-of-phase state, rendering the carrier regeneration circuit unstable and generally impracticable.

Substantially the same problems and deficiencies as described above are present also with an 8-valued rectangular polyphase modulated wave which does not include signal C in FIG. 1. (See the paper "Digital Amplitude-Phase Keying with M-ary Alphabets" by Thomas et al, IEEE Transactions on Communications, vol. COM-22, No. 2, February 1974, FIG. 2 (b)). For relevant carrier regeneration circuits for use in a multiple-valued polyphase modulation system, see U.S. Pats. Nos. 4,039,961 and 4,099,130.

SUMMARY OF THE INVENTION

The object of the present invention is the provision of an improved carrier regeneration circuit for use with an $n(=8,9)$-valued polyphase modulated wave with its signal vectors arranged in lattice form and which is free from the problems and deficiencies described above.

According to the present invention, there is provided a carrier regeneration circuit which comprises first and second means for quadrature detection of an $n(=8,9)$-valued polyphase modulated wave having signal vectors arranged in lattice form with a reference carrier wave to produce a first and a second demodulated signal, respectively; means responsive to the modulated wave and the first and second demodulating signals or to the modulated wave alone for regenerating the reference carrier wave phase-locked at a multiple of $\pi/2$ radians under a control signal, and means for phase-shifting the first and second demodulated singals by $\pi/4$ radians and discriminating and combining the levels of the phase-shifted first and second demodulated signals to form the control signals.

The present invention will next be described in detail with reference to the accompanying drawings which illustrate preferred embodiments of the invention.

DESCRIPTION OF THE PREFERRED EMBODIMENTS

Figure 2:
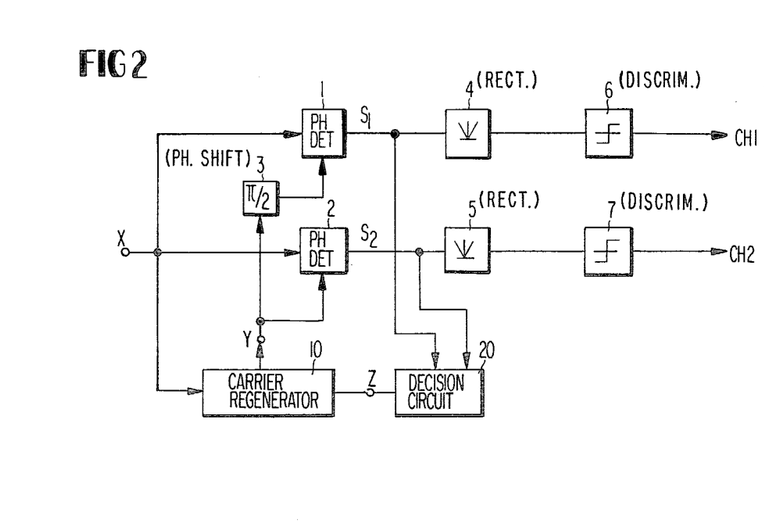
FIG. 2 is a block diagram showing an example of the carrier regeneration circuit embodying the present invention.

The carrier regeneration circuit illustrated in FIG. 2 includes phase detectors 1 and 2, a $\pi/2$ phase-shifter 3, full-wave rectifier circuits 4 and 5, discriminating circuits 6 and 7, a 4-phase carrier regenerator 10 and a decision circuit 20. As seen in FIG. 3A, the decision circuit 20, which is a characteristic feature of the present invention, is made up of an adder 22, a subtracter 23, full-wave rectifier circuits 24 and 25, discriminators 26 and 27, and an OR gate 28. Further, the 4-phase carrier regenerator 10 includes a $\pi/4$ modulator 11, four-fold multiplier circuits 12 and 14, a phase comparator 13, a voltage-controlled oscillator 15, and a low-pass filter 16.

The modulated signal, applied to the input terminal X of phase detectors 1 and 2, is quadrature-detected by the regenerated carrier wave Y from the 4-phase carrier regenerator 10 to form demodulated signals $S_1$ and $S_2$. These signals $S_1$ and $S_2$ are full-wave rectified, respectively, by the full-wave rectifier circuits 4 and 5 into binary signals which are discriminated at a predetermined level by discriminators 6 and 7. The binary signals appear at respective terminals CH1 and CH2.

Moreover, as shown in FIG. 3A, the input modulated wave, entering the 4-phase carrier regenerator 10, is fed through the $\pi/4$ demodulator or doubler circuit 11 and fourfold-multiplier circuit 12 to one input terminal of phase comparator 13. The output of the voltage-controlled oscillator 15 is fed through the fourfold-multiplier circuit 14 to the other input terminal of the phase comparator 13 and the phase error output signal of the latter is passed through the low-pass filter 16 to control the voltage-controlled osciallator 15. The operation of the circuits is described in U.S. Pat. No. 4,114,710 referred to above.

The operation of the decision circuit, which is another characteristic feature of the present invention will be described next with reference to FIG. 4. In this figure, reference characters $S_i^1$ and $S_i^2$ represent the signals $S_i(i=1, 2, \ldots, 9)$ of FIG. 3A, corresponding to the modulated signals $a_1$–$a_4$ and $b_1$–$b_4$ indicated in FIG. 1, respectively.

Output signals from the phase detectors 1 and 2 are expressed, respectively, as follows;

$$S_1^1 = \beta \sin \theta, \quad S_1^2 = \gamma \sin(\theta - \frac{\pi}{4})$$

$$S_2^1 = \beta \cos \theta, \quad S_2^2 = \gamma \cos(\theta - \frac{\pi}{4})$$

in which $\theta$ represents the phase difference between the input signal wave and the reference carrier wave. Normally $$\theta = (m \cdot \frac{\pi}{2} + \frac{\pi}{4}) \text{ radians}$$

where m = 1, 2, 3, 4. These signals have the waveforms shown at A in FIG. 4, where $d_1$–$d_4$ represent the phase stable points, indicating that the demodulated signal has three levels.

Referring again to FIG. 3A, the signals $S_1$ and $S_2$ are summed at the adder 22 to obtain a signal $S_3$ ($S_3^1$ and $S_3^2$) delayed by $\pi/4$ radians as compared with the signals $S_2$. At the subtracter 23, signal $S_2$ is subtracted from signal $S_1$ to obtain a signal $S_4$ ($S_4^1$ and $S_4^2$) which is delayed by $\pi/4$ radians as compared with the signal $S_1$. The formation of the signals $S_3$ and $S_4$ is illustrated in FIG. 4 at B, where $d_5$–$d_8$ represent the phase-stable points indicating that these signals $S_3$ ($S_3^1$ and $S_3^2$) and $S_4$ ($S_4^1$ an $S_4^2$) normally form a 5-valued demodulated signal. Referring to FIG. 3A, the signals $S_3$ and $S_4$ are full-wave rectified at the respective full-wave rectifier circuits 24 and 25 to form signals $S_5$($S_5^1$ and $S_5^2$) and $S_6^1$ and $S_6^2$) as shown in FIG. 4 at D and C, respectively. The signals $S_5$ and $S_6$ are then discriminated by the respective discriminators 26 and 27 to form signals $S_7$ and $S_8$. The level of discrimination is selected at f in FIG. 4 at C and D where:

$$f = (e + g)/2 = (\beta + \frac{\gamma}{\sqrt{2}})/2 = \frac{\gamma(\sqrt{2} + \frac{1}{\sqrt{2}})}{2} = 1.06\gamma$$

where $e = \beta = \sqrt{2} \cdot \gamma$, $h = \gamma$ and $g = \gamma \cdot \sin\frac{\pi}{4} = \frac{\gamma}{\sqrt{2}}$.

Thus, the signals $S_5^2$ and $S_6^2$ have a maximum amplitude value $\gamma$ which never exceeds the discrimination level f so that the signals $S_7^2$ and $S_8^2$ are held always at the "0" level. The signals $S_7^1$ and $S_8^1$ have the form shown in FIG. 4 at E. These signals $S_7$ and $S_8$ are fed to the OR gate 28 from which there is obtained a signal $S_9$ at its output. As seen in FIG. 4 at F, signal $S_9^2$ is held always at the "0" level while signal $S_9^1$ is held at the "1" level except at regions spaced from the stable points by $\pm\pi/4$ radians where the signal $S_9^1$ is at the "0" level. The signal $S_9$ thus forms, irrespective of the value of $\theta$, a "1" level output for modulated waves $a_1$–$a_4$ and a "0" level output for $b_1$–$b_4$. In the regions spaced from the stable points by $\pm\pi/4$ radians, the control signal apparently disappears but this does not give rise to any ambiguity such as would result in reversal of the polarity of the Exclusive-OR gate.

Figure 4:
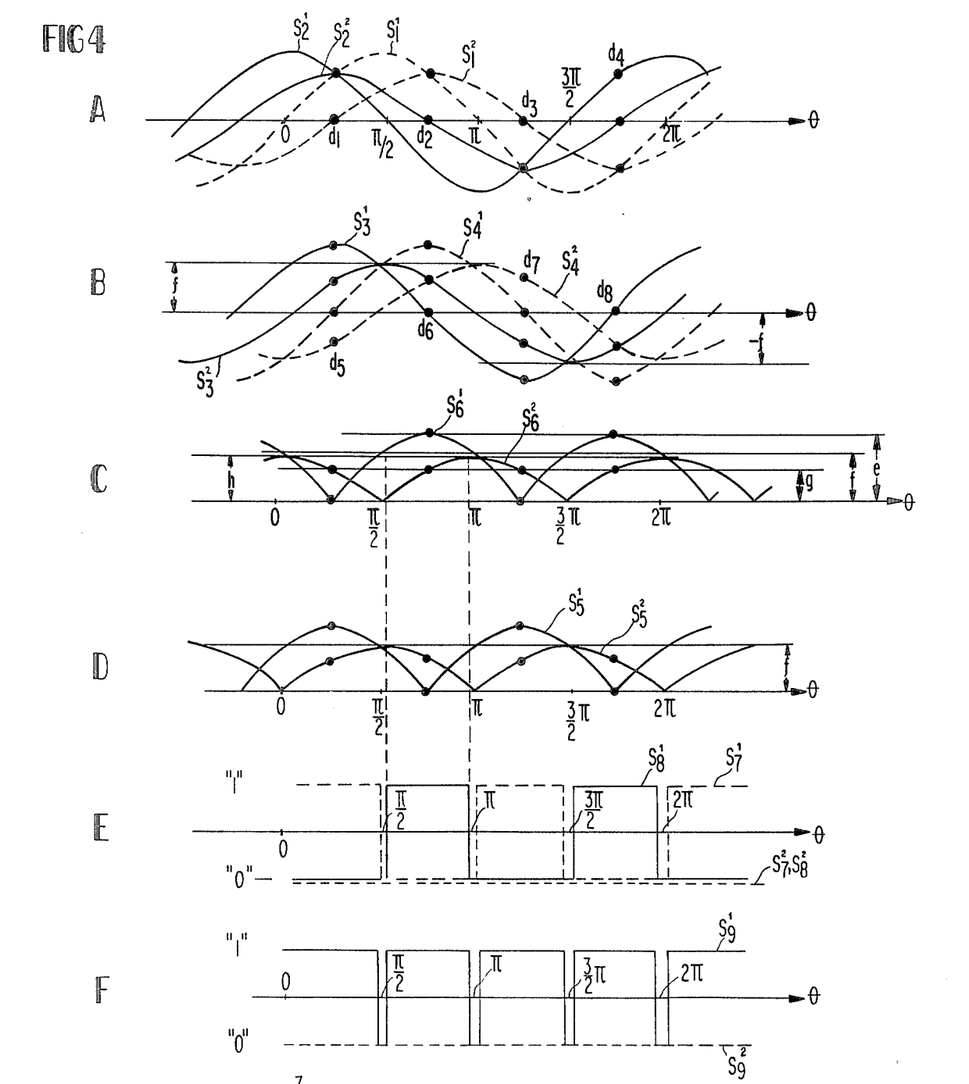
FIG. 4 is a diagram illustrating waveforms taken at different parts in FIGS. 2, 3A and 3B.

In regard to the bit error characteristic of signal $S_9$, referring to FIG. 4, C, the discrimination distance of this signal is expressed as $$e - g = \gamma(\sqrt{2} - \frac{1}{\sqrt{2}})$$

while that of signals $S_1$ and $S_2$ are expressed as $\gamma$, giving a difference therebetween of $$20 \log \frac{\gamma(\sqrt{2} - \frac{1}{\sqrt{2}})}{\gamma} = -3dB.$$

Figure 5:
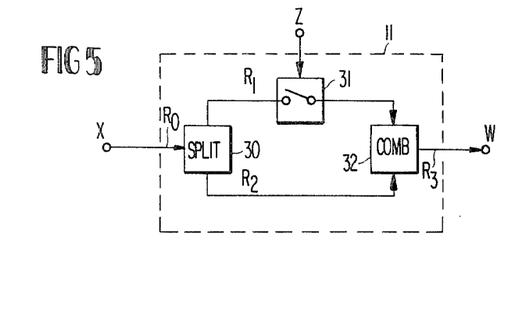
FIG. 5 is a block diagram showing the construction of the $\pi/4$ modulator shown in FIG. 3A.

That is to say, the discrimination distance of signal $S_9$ is reduced by 3 dB as compared to the signals $S_1$ and $S_2$. However, it is improved in comparison with the previously described case of envelope detection by as much as $7.6 - 3 = 4.6$ dB. This means that the signal $S_9$ is 4.6 dB less susceptible to thermal noise as compared to envelope detection. As will be appreciated, with the decision circuit 20, a drive signal $S_9$ can be obtained which does not involve any ambiguity because of the pull-in phase and which is particulary insusceptible to thermal noise. This signal $S_9$ is the same as the output signal of the Exclusive-OR gate in the conventional circuit described heretobefore and, with its use with the $\pi/4$ modulator II, normal operation of the carrier regeneration circuit is obtainable. It may be noted that although the signal at the output of the $\pi/4$ modulator 11 is in the form of a 4-phase PSK wave, it still has an AM component which corresponds in amplitude to the difference between $\beta$ and $\gamma$. Such an AM component can be compensated for by use of a $\pi/4$ phase modulator such as shown in FIG. 5, where the signal amplitude is reduced to $1/\sqrt{2}$ while the phase is shifted by $\pi/4$ radians. The input signal, however, also includes a signal of zero amplitude value such as signal C in FIG. 1 which cannot be compensated for on account of its lack of any actual signal component.

Figure 6:
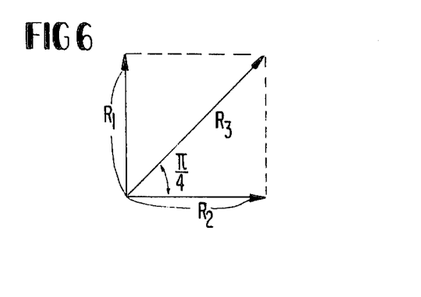
FIG. 6 is a signal vector diagram of the circuit shown in FIG. 5.

FIG. 5 illustrates a practical example of the $\pi/4$ phase modulator 11 which includes a splitter 30, a switch 31 and a combiner 32. FIG. 6 is a vector diagram illustrating the operation of the device of FIG. 5.

The operation of this device will now be described. Input signal X is divided at the splitter 30 into two signal components one of which is directed through switch 31 to the combiner 32 and the other of which is directly coupled to the combiner 32 for quadrature combination with the first component. In FIG. 6, vector $R_3$ represents the combiner output when the switch 31 is ON. When the switch 31 is OFF, the output will then be represented by a vector such as indicated at $R_2$ which has a difference in phase of $\pi/4$ radians and a difference in amplitude of $1/\sqrt{2}$ relative to the output obtainable when the switch 31 is ON. Accordingly, the control signal Z can be employed for the circuit FIG. 5 as long as it is cut OFF at the time of signals $a_1$–$a_4$.

It will be readily appreciated from the foregoing discussion that the first and second problems pointed out heretobefore are solved by the use of the decision circuit 20 and the $\pi/4$ phase modulator 11. It may also be mentioned that in FIG. 3 A, the $\pi/4$ phase modulator 11 may be interposed between the fourfold-multiplier 12 and the phase comparator 13, if desired.

Figure 3B:
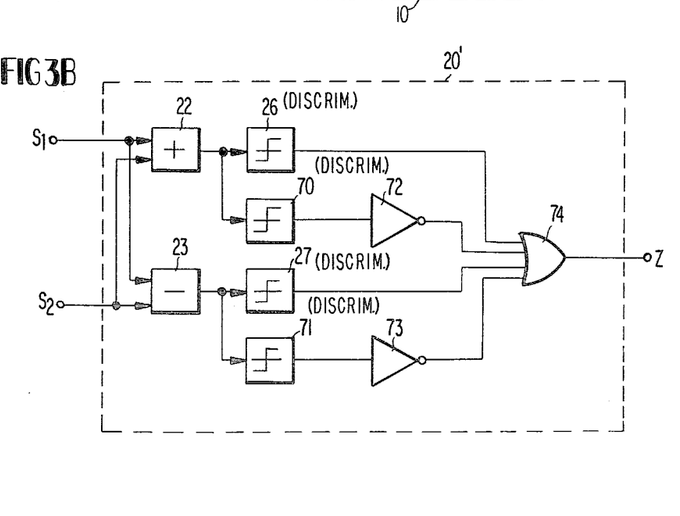
FIG. 3B illustrates a modified form of the decision circuit shown in FIG. 2.

Another preferred form of decision circuit 20 is illustrated in FIG. 3B, in which circuit the outputs (at B in FIG. 4) of the adder 22 and subtracter 23 are discriminated by means of discriminators 26, 27, 70 and 71. The first two of these discriminators, 26 and 27, have a discrimination level of F as in FIG. 3B while the remaining two discriminators 70 and 71 have a discrimination level of $-f$, as observed in FIG. 4 at B. The outputs of discriminators 26 and 27 are connected directly to the OR gate 74 and those of discriminators 70 and 71 are coupled thereto through respective inverters 72 and 73. At the output of OR gate 74 there appears a signal the same as that shown in FIG. 4 at F.

Figure 7:
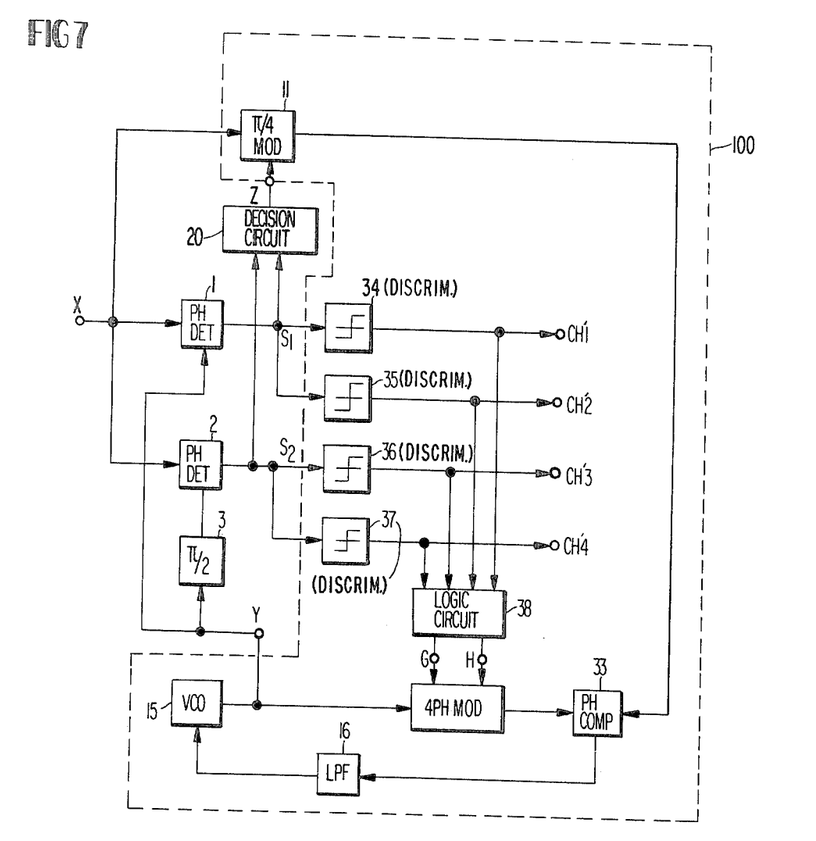
FIGS. 7, 9 and 10 are block diagrams respectively showing other forms of carrier regeneration circuit embodying the present invention.

FIG. 7 illustrates another preferred embodiment of the present invention, which includes, among others, a phase comparator 33, discriminators 34–37, a logic circuit 38 and a 4-phase phase modulator 39, Reference numeral 100 designates a 4-phase carrier regenerator which includes a $\pi/4$ modulator 11 the signal output of which is fed to one of the input terminals of phase comparator 33. The modulator output is a 4-phase PSK wave as in FIG. 1 formed with signals $a_1$–$a_4$ coinciding with signals $b_1$–$b_4$, as described heretobefore. The signal output of voltage-controlled oscillator 15 is modulated at the 4-phase phase modulator 39 so as to form a signal the same as that of the output signal from $\pi/4$ modulator 11. The signal so modulated is fed to the other input terminal of phase comparator 33. As the result, a phase error signal is obtained at the output of phase comparator 33 which represents the phase difference between the input signal thereto and the output signal from oscillator 15. By coupling the comparator output to the oscillator by way of a low-pass filter 16, the oscillator 15 is controlled so as to produce an output signal in phase with the input signal and thus enabling the circuit to function as a carrier regeneration circuit.

The operation of the 4-phase phase modulator 39 will be described next with reference to Table 1 below:

|   | A |   | B Modulated vector | C Phase deviation | D |   |   |   | E Phase deviation | F |   |
|---|---|---|---|---|---|---|---|---|---|---|---|
|   | $S_1$ | $S_2$ |   |   | CH1' | CH2' | CH3' | CH4' |   | G | H |
| 1 | $\gamma$ | 0 | $b_1$ | 0 | 1 | 1 | 0 | 1 | 0 | 0 | 0 |
|   | $\gamma$ | $\gamma$ | $a_1$ |   | 1 | 1 | 1 | 1 |   |   |   |
| 2 | 0 | $\gamma$ | $b_2$ | 90° | 0 | 1 | 1 | 1 | 90° | 0 | 1 |
|   | $\gamma$ | $\gamma$ | $a_2$ |   | 0 | 0 | 1 | 1 |   |   |   |
| 3 | $\gamma$ | 0 | $b_3$ | 180° | 0 | 0 | 0 | 1 | 180° | 1 | 1 |
|   | $\gamma$ | $\gamma$ | $a_3$ |   | 0 | 0 | 0 | 0 |   |   |   |
| 4 | 0 | $\gamma$ | $b_4$ | 270° | 0 | 1 | 0 | 0 | 270° | 1 | 0 |
|   | $\gamma$ | $\gamma$ | $a_4$ |   | 1 | 1 | 0 | 0 |   |   |   |

The 4-phase modulator 39 is driven by the output signals G and H from the logic circuit 38. The relationship of the signals G and H to the phase deviation of 4-phase modulator 39 is that expressed in Columns E and F in Table 1. The signals G and H are formed as follows. The signal outputs $S_1$ and $S_2$ of phase detectors 1 and 2 take the form of a 3-valued signal of a phase-stable level as shown in FIG. 4 at A, which may take values of $+\gamma$, 0 and $-\gamma$.

The relationship between the modulation vectors shown in FIG. 1 and the detector output signals is expressed in Columns A and B in Table 1. Since the signal output of the $\pi/4$ modulator 11 which is the single signal input to the phase comparator 33, is a 4-phase PSK wave including $a_1$–$a_4$ coinciding with $b_1$–$b_4$, as described above, the output signal of the 4-phase modulator 39, or the other input signal to the phase comparator 33, must also be a 4-phase PSK wave with $a_1$–$a_4$ coinciding with $b_1$–$b_4$. The 4-phase modulator 39, therefore, must be driven in the relation expressed in Columns B and C in Table 1. That is, the drive signals G and H to the 4-phase modulator 39 must be in the same relation as expressed in Columns A and F in the table. Signals $S_1$ and $S_2$ are coupled to the discriminators 34–37 the outputs of which are binary signals CH1'–CH4'. Discriminators 34 and 36 have a discrimination level of $+(\gamma/2)$ while discriminators 35 and 37 have a discrimination level of $-(\gamma/2)$ so that signals Ch1'–CH4' are obtained which have values as indicated in Table 1, Column D. As long as the signals of Column F are in the state of Column D, the 4-phase modulator 39 operates as intended.

Figure 8:
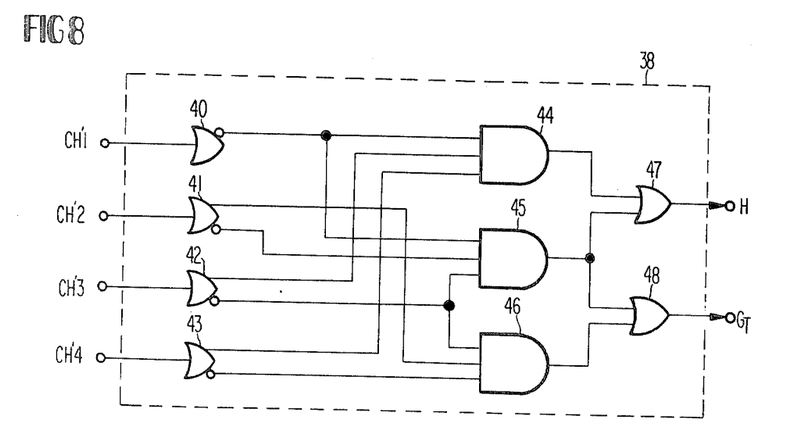
FIG. 8 is a detailed circuit diagram of the logic circuit shown in FIG. 7.

FIG. 8 illustrates a preferred form of logic circuit 38 which will produce the signals of Column F in the state of Column D, the circuit OR/NOR gates 40–43, AND gates 44–46 and OR gates 47–48.

Figure 9:
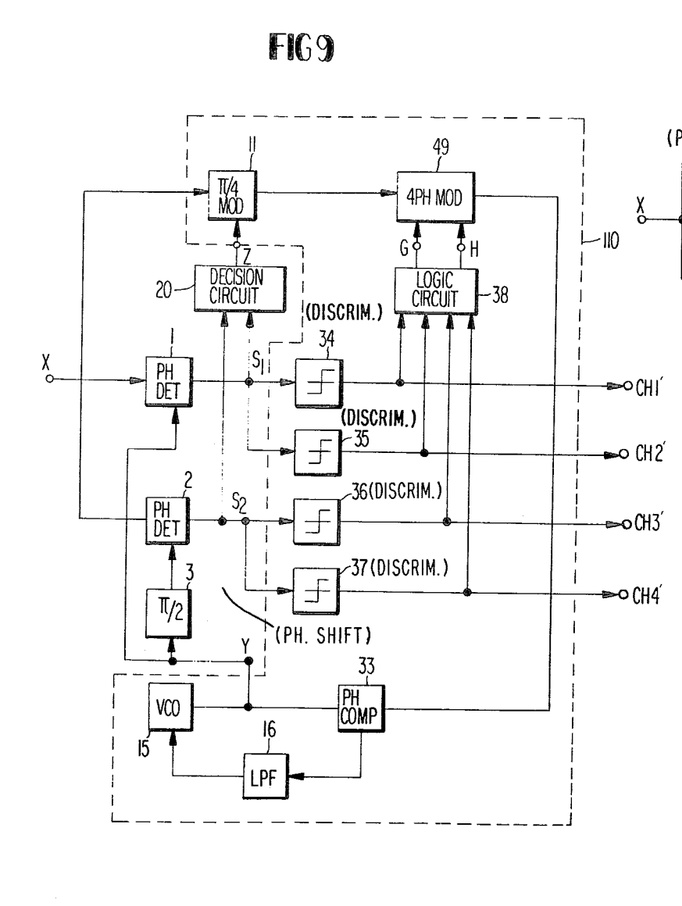

FIG. 9 illustrates a further preferred embodiment of the present invention which differs from the embodiment of FIG. 7 in that the carrier waves are phase-compared with each other by the phase comparator 33 to obtain a phase error signal while in the previous embodiment the modulated waves are phase-compared with each other by the phase comparator 33. In the embodiment of FIG. 9, the output signal of the $\pi/4$ modulator 11 is a 4-phase PSK signal with $a_1$–$a_4$ coinciding with $b_1$–$b_4$ as in the case of the previous embodiment. Accordingly, the signal is inversely modulated by the 4-phase modulator 49 to eliminate the modulation component. The drive signals G and H to the 4-phase modulator 49 are obtained in substantially the same manner as in the case of FIG. 7. Here, only the direction of rotation of modulation must be reversed from that in the embodiment of FIG. 7. That is, the signals G and H need to be interchanged. The signal outputs from the 4-phase modulator 49 and the voltage-controlled oscillator 15 are coupled to the phase comparator 33 to obtain a phase error signal, which is directed through low-pass filter 16 to drive the VCO 15 in order that normal operation of the carrier regeneration circuit of FIG. 9 is obtained. Reference numeral 110 indicates a 4-phase carrier regeneration included in the circuit.

Figure 10:
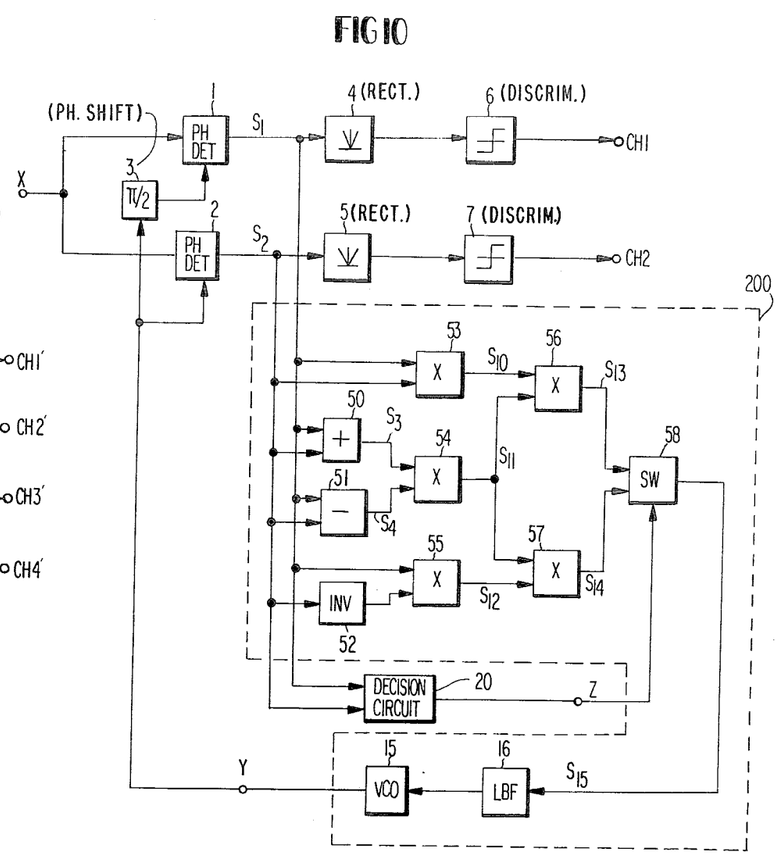

Illustrated in FIG. 10 is a further preferred embodiment of the present invention of a base-band processing system. Reference numeral 50 indicates an adder, 51 a subtractor, 52 phase inverters, 53 to 57 multiplication circuits, 58 an analog switch and 200 a 4-phase carrier regenerator.

Figure 11:
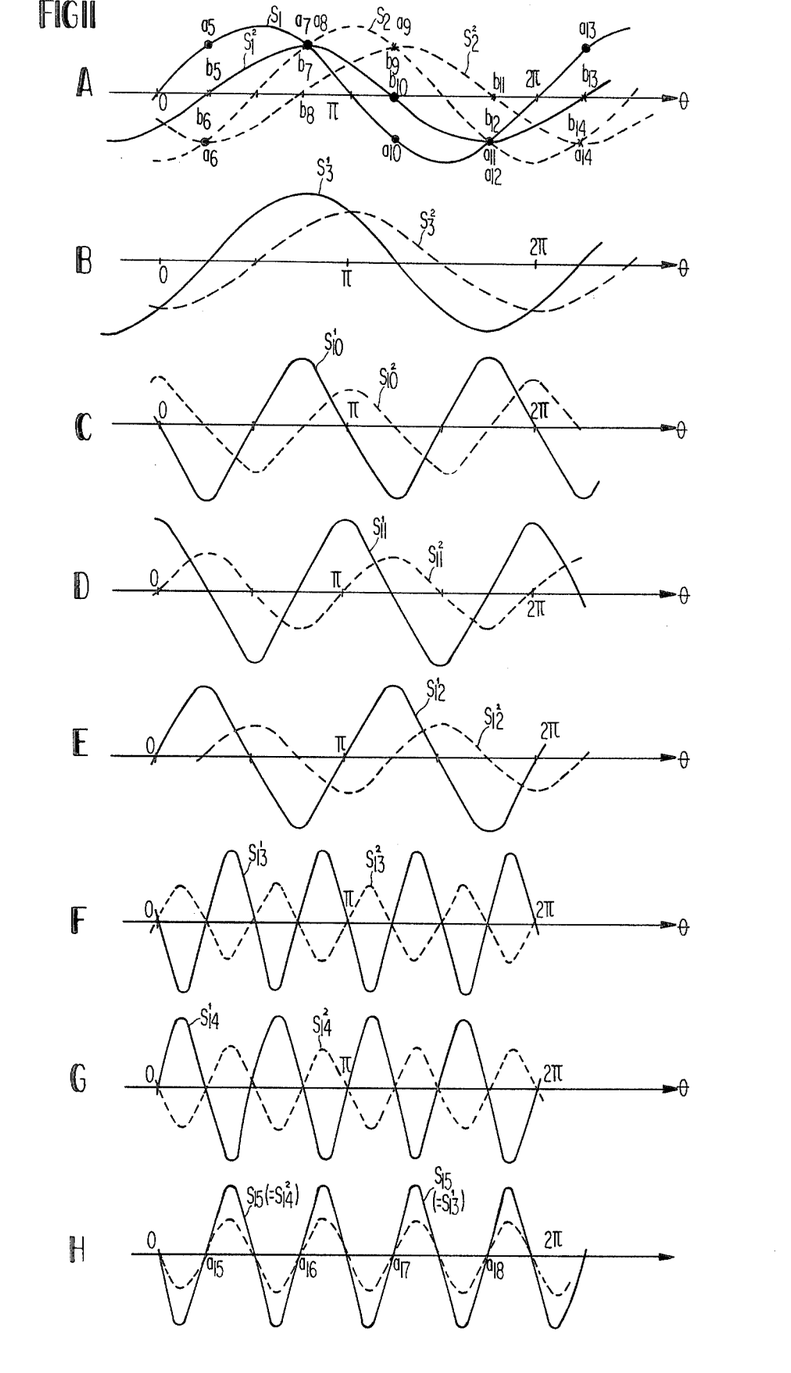
FIG. 11 is a diagram showing waveforms taken at different points in the circuit of FIG. 10.

Waveforms appearing at various locations in the circuit of FIG. 10 are illustrated in FIG. 11, in which the abscissa $\theta$ represents the phase relation between the input signal at phase detectors 1 and 2 and the reference carrier wave. With reference also to the diagram of FIG. 11, the input signal is phase-detected by the phase detectors 1 and 2 with the output of voltage-controlled oscillator 15 serving as a reference carrier signal. The reference carrier signal coupled to one of the phase detectors 2 is delayed by $\pi/2$ radians by means of $\pi/2$ phase shifter 3 to maintain a phase difference of $\pi/2$ between the output signals of the two phase detectors 1 and 2 which are indicated at $S_1$ and $S_2$ respectively in FIG. 11. In FIG. 11, signals Si (i=1 to 4 and 10 to 14) in the circuit of FIG. 10 are represented by $Si^1$ and $Si^2$ corresponding to the modulated signals $a_1$–$a_4$ and $b_1$–$b_4$ in FIG. 1, respectively. In the signals $S_1(S_1^1$ and $S_1^2)$ and $S_2(S_2^1$ and $S_2^2)$ shown in FIG. 11 at A, $a_5$–$a_{14}$ represent detected signals for the signal having an amplitude of $\beta$ and $b_5$–$b_{14}$ represent those for the signal having an amplitude of $\gamma$. At the adder 50, signals $S_1$ and $S_2$ are summed to obtain signals $S_3(S_3^1$ and $S_3^2)$ which are delayed $\pi/4$ radians relative to the signals $S_1(S_1^1$ and $S_1^2)$ as indicated in FIG. 11 at B. Similarly, at the subtractor 51, signals $S_1$ are subtracted from signals $S_2$ and signals $S_4(S_4^1$ and $S_4^2)$ are obtained which are delayed $\pi/4$ radians relative to the signals $S_2(S_2^1$ and $S_2^2)$. By multiplying signals $S_3$ and $S_4$ with one of the multiplication circuit 54, signals $s_{11}(S_{11}^1$ and $S_{11}^2)$ are obtained as shown in FIG. 11 at D. Similarly, by multiplying signals $S_1$ and $S_2$ with another multiplication circuit 53, signals $S_{10}(S_{10}^1$ and $S_{10}^2)$ are obtained as shown in FIG. 11 at C. Further, with the multiplication circuit 55, by multiplication of the signals $S_1$ and the signals $S_2$ inverted in polarity by phase inverter circuit means, signals $S_{12}(S_{12}^1$ and $S_{12}^2)$ are obtained as shown in FIG. 11 at E. The signals $S_{10}$, $S_{11}$ and $S_{12}$ obtained in the manner described are utilized to obtain signals $S_{13}$ and $S_{14}$. That is, signals $S_{13}(S_{13}^1$ and $S_{13}^2)$ and $S_{14}(S_{14}^1$ and $S_{14}^2)$, shown in FIG. 11 respectively at F and G, are obtained respectively by multiplying signals $S_{10}$ and $S_{11}$ with the multiplication circuit 56 and by multiplying signals $S_{11}$ and $S_{12}$ with the multiplication circuit 57.

As is seen in FIG. 11, the signals $S_{13}$ as well as $S_{14}$ are quadrupled in frequency and have a phase difference of $\pi/4$ radians therebetween. That is, they may each be considered a phase error signal obtained by a 4-phase PSK carrier synchronizer circuit with a phase difference of $\pi/4$ radians. Further, at the analog switch 58, one of the signals $S_{13}$ and $S_{14}$ is selected under control of the control signal Z described above with reference to FIGS. 2 and 3. That is, signals $S_{13}$ and $S_{14}$ are selected respectively when the input signal has an amplitude of $\beta$ and when the input signal has an amplitude of $\gamma$ so as to obtain an output signal $S_{15}$ as a phase error signal (see FIG. 11, H). The signal $S_{15}$ is coupled through the low-pass filter 16, where any remaining jitter or the like is eliminated, to the voltage-controlled oscillator 15 as a control signal therefor, thus enabling the circuit of FIG. 10 to normally operate as a carrier regeneration circuit. In this connection, it is to be noted that the signal $S_{15}$ has phase-stable points only at intervals of $\pi/4$ radians as indicated at $a_{15}$ to $a_{18}$ in FIG. 11, H, thus overcoming the limitations of the first problem stated above.

The second problem stated above remains unresolved as, in FIG. 11, H, signal waves $S_{13}^1$ and $S_{14}^2$ of the phase error signal $S_{15}$ are different in amplitude from each other. As will be appreciated however, this problem can readily be solved by the provision of an attenuator between the multiplication circuit 56 and the switch 58 with the attenuation factor adjusted to make the amplitude value of signal waveform $S_{13}^1$ equal to that of signal waveforms $S_{14}^2$. Alternatively an attenuator and a switch connected in parallel thereto may be provided between the switch 58 and filter 16 so that the input and output of the attenuator may be directly connected with or disconnected from each other.

Although in FIG. 1 the 4-phase PSK carrier regeneration circuit has employed multiplier means in the form of a multiplication circuit, it is to be understood that there is no definite limitation on the particular implementation of the 4-phase PSK carrier regeneration circuit, which may employ any other form of multiplier means such as a full-wave rectifier circuit or an analog switch.

As will be readily appreciated from the foregoing description, according to the present invention, there is realized a 9-valued AM carrier regeneration circuit which has phase-stable points only at intervals of $\pi/4$ radians which can be dealt with in the system design in the same manner as ordinary PSK carrier regeneration circuits. Further, unlike the previous examples described, the possibility of generating modulating signals is not present in the pull-in-phase decision circuit, this being an essential feature of the present invention. Thus, the present invention is applicable not only to a 9-valued QAM partial response system but also to an 8-valued rectangular polyphase modulation system.

Moreover, it will be apparent to those skilled in the art that in the present invention use of AM component compensation means is not necessary and satisfactory results can be obtained as well without use of any such compensation means.

What is claimed is:

1. A carrier regeneration circuit comprising:
   first and second means for quadrature detecting an $n(=8, 9)$-valued polyphase modulated wave including signal vectors arranged in lattice form with a reference carrier wave to produce a first and a second demodulated signal, respectively,
   means responsive to said modulated wave for regenerating said reference carrier wave phase-locked at a multiple of $\pi/2$ radians under a control signal, and
   decision circuit means for phase shifting said first and second demodulated signals by $\pi/4$ radians and discriminating and combining the levels of the phase-shifted first and second demodulated signals to produce said control signal.

2. A carrier regeneration circuit as claimed in claim 1 wherein said regenerating means comprises means for eliminating an AM component contained in said reference carrier wave.

3. A carrier regeneration circuit as claimed in claim 1 in which said decision circuit means comprises:
   first and second means for phase shifting said first and second demodulated signals, respectively, by $\pi/4$ radians,
   first and second means for full-wave rectifying the respective outputs of said first and second phase shifting means,
   first and second means for discriminating the respective outputs of said first and second rectifying means at a predetermined level; and
   means for combining the outputs of said first and second discriminating means to produce said control signal.

4. A carrier regeneration circuit as claimed in claim 3 wherein: said first phase shifting means comprises means for summing said first and second demodulated signals, and
   wherein said second phase shifting means comprises means for effecting subtraction between said first and second demodulated signals.

5. A carrier regeneration circuit as claimed in claim 1 wherein said decision circuit means comprises first and second means for phase shifting said first and second demodulated signals respectively by $\pi/4$ radians, first and second means for discriminating the output of said first phase shifting means at a first predetermined level, and third and fourth means for discriminating the output of said second phase shifting means at a second predetermined level, and means for combining the outputs of said first through fourth means for discriminating to produce said control signal.

6. A carrier regeneration circuit as claimed in claim 5, wherein said first phase shifting means comprises means for summing said first and second demodulated signals and said second phase shifting means comprises means for effecting subtraction between said first and second demodulated signals.

7. A carrier regeneration circuit comprising:
   first and second means for quadrature-detecting an $n(=8, 9)$-valued polyphase modulated wave including signal vectors arranged in lattice form with a reference carrier wave to produce a first and a second demodulated signal, respectively, means responsive to said modulated wave and said first and second demodulated signals for regenerating said reference carrier wave phase-locked at a multiple of $\pi/2$ radians under a control signal; and decision circuit means for phase shifting said first and second demodulated signals by $(\pi/4)$ radians and discriminating and combining the levels of said first and second demodulated signals to produce said control signal.

8. A carrier regeneration circuit as claimed in claim 7, wherein said regenerating means comprises means for eliminating an AM component contained in said reference carrier wave.

9. A carrier regeneration circuit as claimed in claim 7, in which said decision circuit means comprises:
  first and second means for phase shifting said first and second demodulated signals, respectively by $\pi/4$ radians,
  first and second means for full-wave rectifying the respective outputs of said first and second phase shifting means,
  first and second means for discriminating the respective outputs of said first and second rectifying means at a predetermined level; and
  means for combining the outputs of said first and second discriminating means to produce said control signal.

10. A carrier regeneration circuit as claimed in claim 9, wherein: said first phase shifting means comprises means for summing said first and second demodulated signals, and
  wherein said second phase shifting means comprises means for effecting subtraction between said first and second demodulated signals.

11. A carrier regeneration circuit as claimed in claim 7, wherein said decision circuit means comprises first and second means for phase shifting said first and second demodulated signals respectively by $\pi/4$ radians, first and second means for discriminating the output of said first phase shifting means at a first predetermined level and third and fourth means for discriminating the output of said second phase shifting means at a second predetermined level and means for combining the outputs of said first through fourth means for discriminating to produce said control signal.

12. A carrier regeneration circuit as claimed in claim 11, wherein said first phase shifting means comprises means for summing said first and second demodulated signals and said second phase shifting means comprises means for effecting subtraction between said first and second demodulated signals.

* * * * *

UNITED STATES PATENT AND TRADEMARK OFFICE
CERTIFICATE OF CORRECTION

PATENT NO. : 4,255,713
DATED : March 10, 1981
INVENTOR(S) : Yasuharu Yoshida

It is certified that error appears in the above—identified patent and that said Letters Patent is hereby corrected as shown below:

Column 2, line 56, delete "$1_1$" and insert -- $a_1$ -- .

Column 3, line 3, delete "$[\gamma 2-1)/\gamma]$" and insert --

$[\gamma(\ 2-1)/\gamma]$ -- ;

line 44, delete "singals" and insert -- signals -- .

Column 4, line 34, delete "demodulator" and insert -- modulator -- ;

line 41, delete "osciallator" and insert -- oscillator -- .

Column 5, line 16, before "$S_6^{\ 1}$" insert -- ( -- .

Column 6, line 6, delete "II" and insert -- 11 -- .

Column 7, line 22, before "$\gamma$" (first occurrence) insert -- - -- line 23, before "$\gamma$" (first occurrence) insert -- - -- line 24, before "$\gamma$" (first occurrence) insert -- - -- line 25, before "$\gamma$" insert -- - -- line 26, before "$\gamma$" (second occurrence) insert -- - -- line 56, delete "Ch1' " and insert -- $CH\ell$' -- .

UNITED STATES PATENT AND TRADEMARK OFFICE
CERTIFICATE OF CORRECTION

PATENT NO. : 4,255,713
DATED : March 10, 1981
INVENTOR(S) : Yasuharu Yoshida

It is certified that error appears in the above—identified patent and that said Letters Patent is hereby corrected as shown below:

Column 9, line 1, delete "$s_{11}$" and insert -- $S_{11}$ -- .

Signed and Sealed this

Eighth Day of September 1981

[SEAL]

Attest:

GERALD J. MOSSINGHOFF

Attesting Officer     Commissioner of Patents and Trademarks